March 11, 1958     A. R. ELLIS     2,826,743
BALANCED CAPACITATIVE TYPE COUPLERS Filed Feb. 24, 1955     5 Sheets-Sheet 1

INVENTOR.
A.R. ELLIS

BY Donald C Kearney
Wade Koonitz
ATTORNEYS

March 11, 1958  A. R. ELLIS  2,826,743
BALANCED CAPACITATIVE TYPE COUPLERS
Filed Feb. 24, 1955  5 Sheets-Sheet 2

INVENTOR.
A. R. ELLIS
BY Donald C Keaveney
Wade
ATTORNEYS

March 11, 1958  A. R. ELLIS  2,826,743
BALANCED CAPACITATIVE TYPE COUPLERS
Filed Feb. 24, 1955  5 Sheets-Sheet 3

INVENTOR.
A. R. ELLIS

March 11, 1958 A. R. ELLIS 2,826,743
BALANCED CAPACITATIVE TYPE COUPLERS
Filed Feb. 24, 1955 5 Sheets-Sheet 4

INVENTOR.
A. R. ELLIS

March 11, 1958 A. R. ELLIS 2,826,743
BALANCED CAPACITATIVE TYPE COUPLERS
Filed Feb. 24, 1955 5 Sheets-Sheet 5

INVENTOR.
A. R. ELLIS
BY
ATTORNEYS

United States Patent Office 2,826,743
Patented Mar. 11, 1958

2,826,743

BALANCED CAPACITATIVE TYPE COUPLERS

Allen R. Ellis, Menlo Park, Calif., assignor to the United States of America, as represented by the Secretary of the Air Force Application February 24, 1955, Serial No. 490,443

8 Claims. (Cl. 333—27)

This invention relates to a balanced capacitive type of isolating and coupling unit for transmitting R. F. signals across a non-conducting gap with a minimum of mismatch loss in the frequency pass-band of interest.

More particularly, these units are intended for use in a multiplexing system that permits the simultaneous operation of a plurality of aircraft communication and navigation systems the antennas for which are all confined to an isolated section of a vertical stabilizer. The isolation or coupling units operate independently to conduct signals in their respective frequency bands across the insulating gap in the stabilizer to and from their respective antennas.

One unit disclosed is intended for the U. H. F. Command frequency band of 225 to 400 mc. while the other is intended for the V. H. F. band at 108 to 122 mc. The multiplexing system also includes a liaison transmitter which feeds directly across the insulating gap. Therefore the isolating units must be capable of withstanding high R. F. voltages (of the order of 10 kv.) which appear across the gap when the liaison transmitter is in operation at 2 to 24 mc. Hence the isolating units must have not only a high voltage breakdown point but also a low shunt capacity at the liaison frequencies in addition to their pass-band characteristics at their own operating frequencies. The voltage breakdown and shunt capacity requirements are at least as important as the low V. S. W. R. (voltage standing wave ratio) in the pass-band.

Therefore, the objects of this invention are to provide isolating and coupling units to transmit R. F. signals in their pass-band across a non-conducting gap with a minimum of mismatch loss; to provide such units having high voltage breakdown and low shunt capacity from D. C. to 24 mc.; and to provide such units having a balanced circuit to prevent coupling to the insulating gap.

These objects are achieved by a structure which consists basically of two pairs of tubes mounted parallel to each other, each pair forming a shorted, open wire transmission line section. The capacitive coupling between the shorted line sections may be increased by placing central conductors in each of these four large tubes and connecting the conductors from one tube of each pair in series to form open line sections. A matching section is used both on the input and output of the coupling section to match the characteristic impedance of the basic unit to that of the coaxial line in which it is normally inserted. By proper design of these units the mismatch can be made negligible throughout the design frequency band.

The invention will be described in greater detail in conjunction with the accompanying drawings in which like reference characters refer to like parts throughout and wherein.

Figure 6:
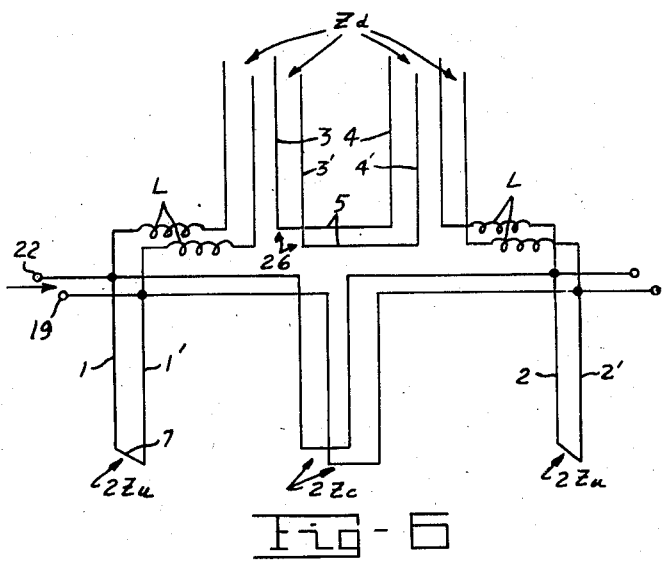

Fig. 6 is the equivalent circuit for the coupling section of the U. H. F. unit.

Figure 7:
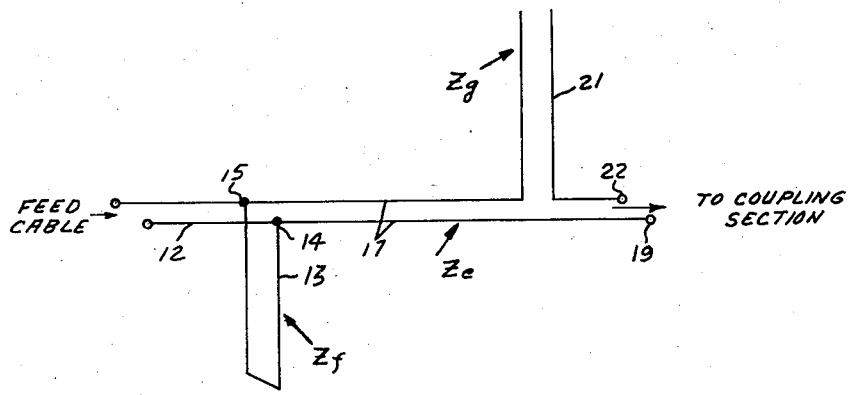

Fig. 7 is the equivalent circuit for one of the two symmetrical matching sections of the U. H. F. units.

Figure 8:
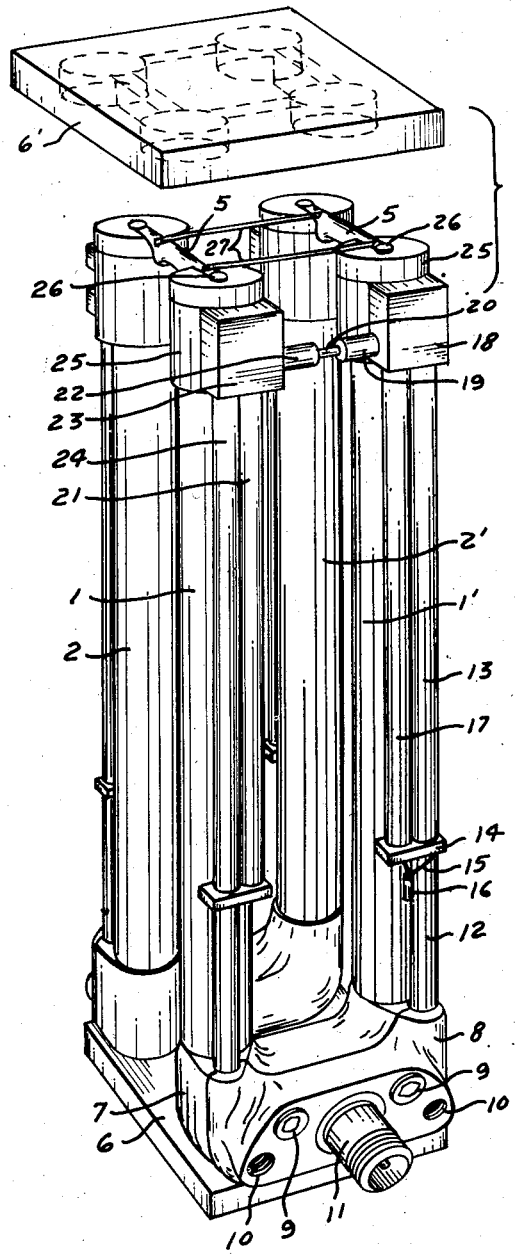

Fig. 8 is a perspective view of the assembled U. H. F. unit with one dielectric end plate removed to show connections.

Figure 9:
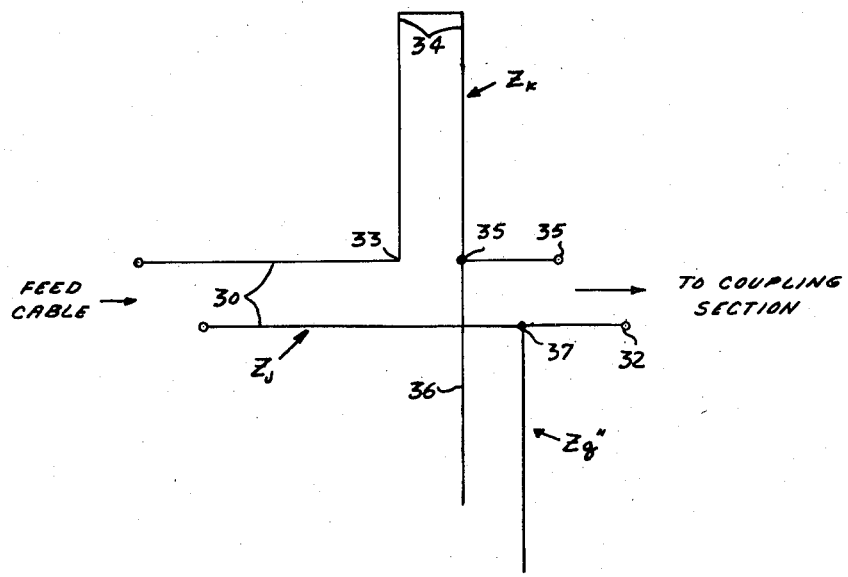

Fig. 9 is an equivalent circuit for one of the two symmetrical matching sections used in the V. H. F. unit.

Figure 10:
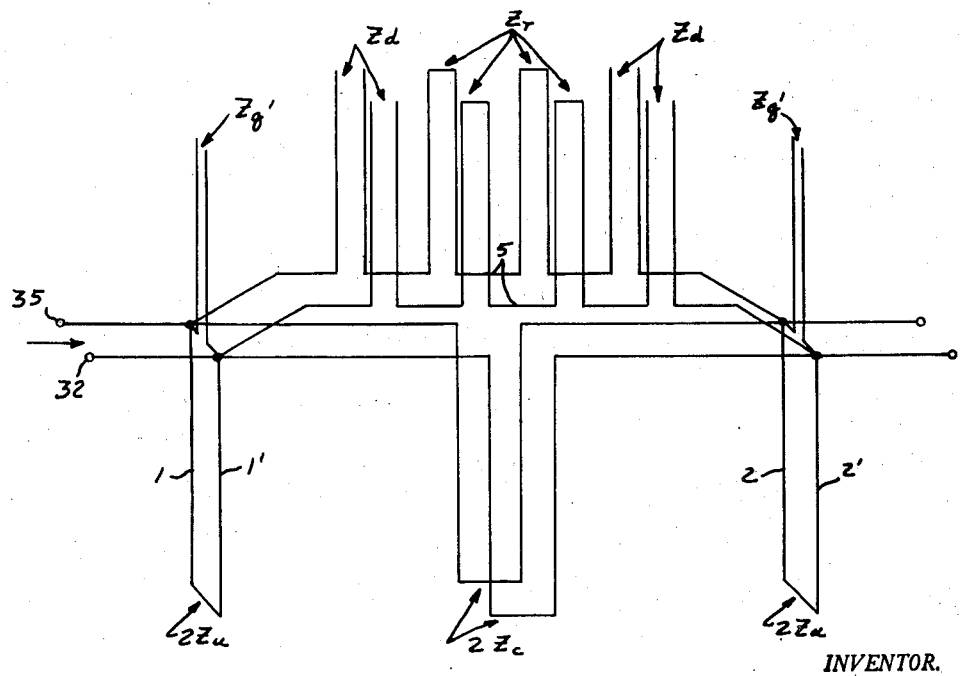

Fig. 10 is an equivalent circuit of the coupling section of the V. H. F. unit.

Figures 11, 12:
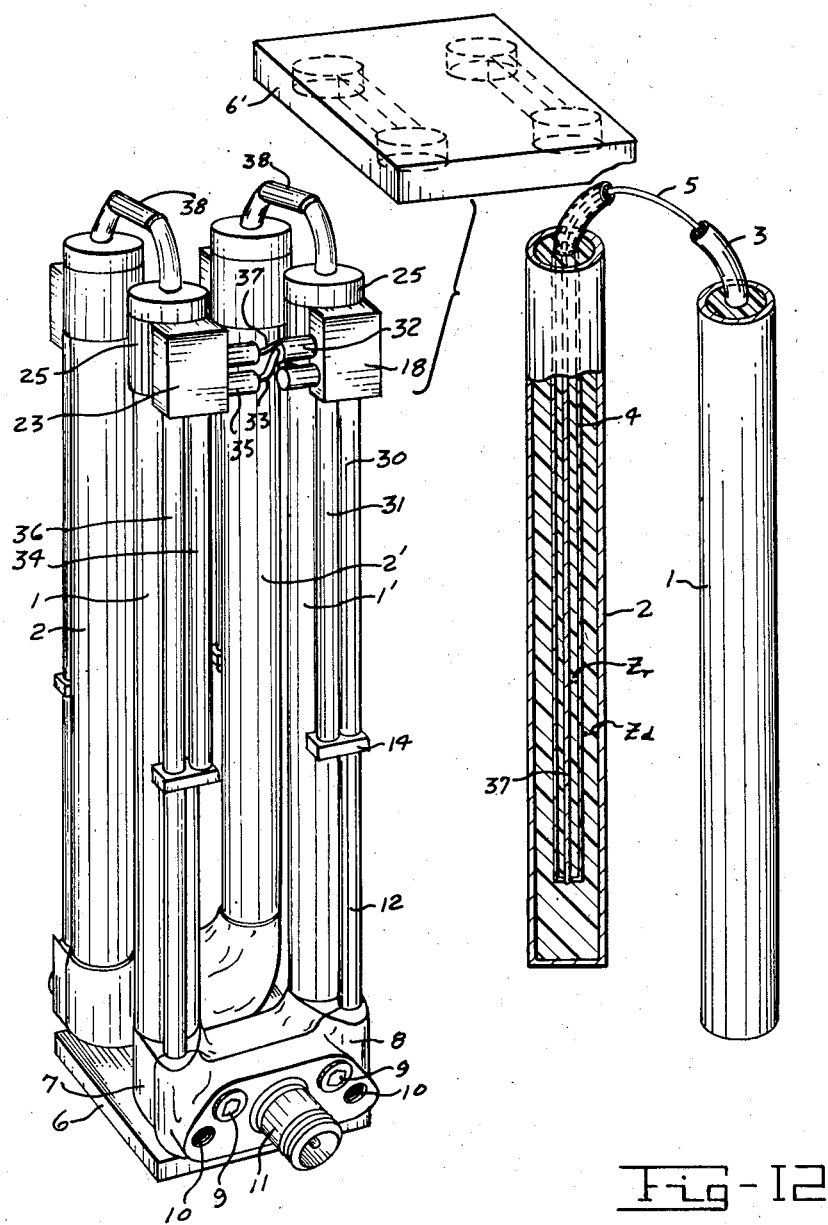

Fig. 11 is a perspective view of the assembled V. H. F. unit with one dielectric end plate removed to show connections.

Fig. 12 is a perspective view partly cut away, of two of the tubes shown in Fig. 11.

Figure 1:
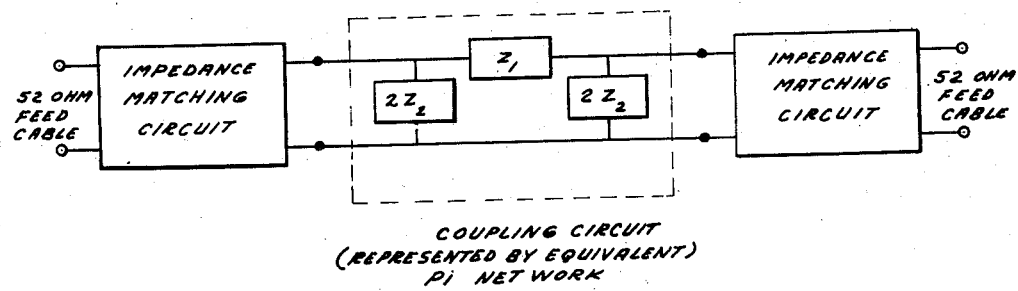
Fig. 1 is a block diagram of the basic organization of the units.

Referring now to the drawings, and particularly Figs. 1 to 5, the isolation units consist of a central coupling circuit which can be represented by a symmetrical pi network, together with an impedance matching network at each end as shown in Fig. 1. By conventional four-pole network theory, the coupling unit will have a pass-band when the vector relation, $0>Z_1/4Z_2>-1$, is satisfied.

The characteristic impedances of the coupling sections in the actual physical embodiments are relatively constant over the band of frequencies to be handled by the units, but they are considerably higher than the impedance of the 52 ohm coaxial feed cable in which the units are intended to be inserted. The coupling circuits must therefore be matched to the impedance of the feed cable with broadband matching networks. The units are symmetrical with respect to input and output ends.

Figure 2:
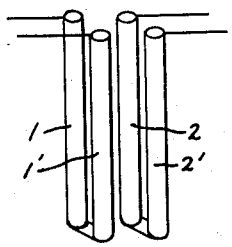
Figs. 2 and 4 are schematic views showing the development of the circuits.
Figure 3:
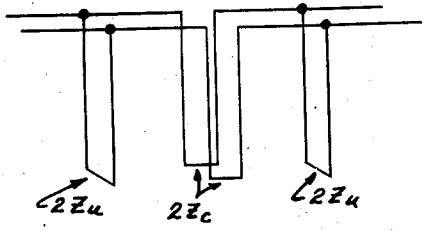
Figs. 3 and 5 are equivalent circuits for Figs. 2 and 4 respectively.
Figure 4:
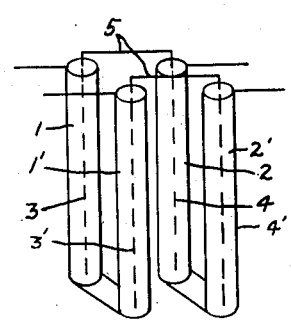
Figure 5:
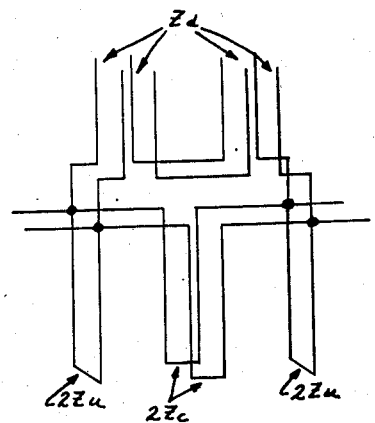

The central coupling circuit consists principally of two shorted, balanced transmission-line sections 1, 1' and 2, 2' juxtaposed physically as indicated in Fig. 2, resonant at the mid-band frequency, and having an impedance $2Z_u$. It can be shown that because of the physical proximity of the two line sections there is electrical coupling between them giving rise to an impedance $2Z_c$ and and that it is possible to represent the coupled line sections by the equivalent circuit shown in Fig. 3. It is apparent that at resonance of the line sections, the impedance of all the sections shown in this figure will be infinite, and there will be no coupling between the input and the output of the circuit. Sufficient coupling can be obtained by shunting the series impedance $2Z_c$ shown in the equivalent circuit by additional elements which have low impedances in the frequency range of interest. If these added series elements are open-circuited line section 3, 3' and 4, 4' connected by the cables of a transmission line 5 as shown schematically in Figs. 4 and 5, the necessary coupling impedance $Z_d$ is provided at the operating frequency of the units.

The above features illustrated in Figs. 1 through 5 are common to and form the basis of operation of both types of units. A physical embodiment of the U. H. F. unit is shown in perspective in Fig. 8, the equivalent circuit for the center coupling section of this unit is shown in Fig. 6, and the equivalent circuit for one of the two symmetrical impedance matching sections of the unit is shown in Fig. 7.

The U. H. F. unit is assembled between dielectric plates 6, 6' and comprises a metallic shorting bar 7 on which the two hollow tubes 1, 1' of the central coupling section are mounted. A metallic face plate 8 is attached to the shorting bar 7 by bolts 9 and is provided with threaded holes 10 adapted to receive bolts to mount the symmetrical unit in a horizontal position in an insulating gap of a vertical stabilizer. The face plate 8 is also provided with a connector 11 to which coaxial feed cable is adapted to be attached. The feed cable is continued by coaxial line 12. A shorted shunting stub 13 having an impedance $Z_t$ is connected across line 12 at terminal 14, the stub 13 being internally shorted at its upper end. A short length of open lead 15 connects the center conductor of stub 13 to the center conductor of a quarter wave line transformer 17. The distributed inductance of the lead 15 is compensated for by a small lumped capacitance 16. The outer conductors of stub 13 and transformer 17 are in contract and are joined at the terminal and supporting block 14. Their upper ends are supported by metallic terminal block 18 which also has projecting from it a terminal 19 of the outer conductor of the line transformer 17. The inner conductor of the line transformer 17 is connected by an insulated lead 20 which passes through terminal 19 to the inner conductor of an open series stub 21 having an impedance $Z_g$. The outer conductor of stub 21 terminates in block 23 which also has a terminal 22 projecting therefrom. A dummy element 24 is added to the assembly to preserve mechanical symmetry and electrical balance.

Terminals 19 and 22 of the input impedance matching section are connected through mounting and terminal blocks 18 and 23 respectively to the tubes 1' and 1 which form the quarter wave shorted line section $2Z_u$ at the input of the coupling section. Tubes 1, 1' have plastic insulating plugs 25 at the top thereof. Plugs 25 are provided with terminals 26 which connect the bridging cables 5 to conductors forming open line sections 3, 3' inside the tubes 1, 1'. The line sections 3, 3' have impedances $Z_d$. Straps 27 are used to adjust the impedance of line 5 to the desired value.

The rear half of the unit, i. e., the portion built around the tubes 2, 2' is an exact mirror image of the portion described above. In view of the symmetry involved the rear portion will not be described in detail.

The central coupling section of the U. H. F. unit is seen to be very much like the ideal section described in Figs. 1 to 5 except for certain deviations which are necessitated because it is impossible physically to construct circuits which behave exactly as do the ideal circuits of the mathematical theory. The lengths of the transmission line elements used in the construction of the coupling section are fixed by the frequency of operation of the unit, 225 to 400 mc.; cross-sectional dimensions and spacings are determined by voltage breakdown requirements. The elements composing the coupling section are resonant at the center frequency of the band and are, therefore, approximately a quarter-wave length long at that frequency. Lumped loading introduced by end effects in the lines and by connections between elements causes some discrepancy, however, and in general reduces the length of the elements from the ideal quarter-wave length. For example, the terminals of line sections $Z_u$ and $Z_d$ are considered to be at the same point in the idealized unit shown in Fig. 5. In the physical unit, however, the terminals of these line sections are at 19, 22 and 26, 26 respectively in Fig. 8. The physical separation involved has the electrical effect of introducing a lumped inductance L between the points as shown in the schematic diagram of Fig. 6. It is necessary to compensate for this inductive effect by shortening the series line section $Z_d$ approximately two centimeters from the quarter-wave value. One result of such lumped-loading effects is the alteration of the characteristic impedance of the coupling section.

The physical separation of the two halves of the coupling section furnishes another instance in which the ideal design is modified to accommodate the exigencies of practical construction. Ideally, the central coupling section is a simple pi network. Practically, however, the network is split at the mid point of the series element and the two halves moved a considerable fraction of a wavelenght apart. No difficulty would be experienced because of this procedure if the halves were joined by a balanced transmission line with a characteristic impedance equal to the image impedance of the half sections. Such a solution is not possible at more than one frequency, however, because the image impedance in question is a function of frequency, and is approximately 7 percent lower at the band limits than at the center frequency. Some discontinuity is unavoidably introduced, therefore, but is minimized by proper adjustment of the impedance of the line joining the halves. By adjusting the impedance of this line to the mean of the extreme values which the image impedance takes, the discontinuity will, in effect, be distributed throughout the band rather than concentrated largely at the center or at the band limits. The correct impedance for the line is approximately 107 ohms, which is conveniently obtained by strapping the shields of two pieces of RG–58/U cable as indicated at 27 in Figure 8. The two center conductors 5 then form a balanced line with a characteristic impedance of 107 ohms.

Although all electrical lengths are a quarter-wave at mid band, the physical lengths are adjusted to fit most conveniently the physical layout of the unit as a whole by the choice of dielectric used. Thus, polystyrene dielectric is used in the shunting stub, while Teflon dielectric is used in the line transformer and the series stub which are required to be physically longer. The outer conductors of all the elements in the matching circuit are quarter-inch, thin-wall, brass tubing. The correct characteristic impedances are obtained by properly choosing the diameters of the inner conductors. Lumped loading due to connections between elements, while minimized by the arrangement of components, can not be eliminated altogether. The short length of open lead, indicated at 15 of Fig. 8, connecting the center conductors of the line transformer $Z_e$ and the shunting stub $Z_t$ adds sufficient lumped inductance to seriously deteriorate the performance of the unit. The effect of the lumped inductance is compensated for, however, by the small lumped capacitance shown at 16 in the figure. The arrangement of the elements composing the matching circuit is such that the high impedance terminals are balanced. The circuit is thus made to serve as a balun to connect the unbalanced feed cable to the balanced coupling section.

Electrical tests of the U. H. F. unit indicate that it has a V. S. W. R. of less than 1.4 at all frequencies in the range 225 to 400 mc. Voltage breakdown tests were conducted with one of the units at a frequency of 2.3 mc./s. and at normal atmospheric pressure. Breakdown occurred at a peak R.-F. voltage of 20,000 volts. A check of the gap-shunting capacitance introduced by the unit at liaison frequencies gave a figure of 25 mmf.

The V. H. F. (108–122 mc.) unit is shown in Figs. 9 to 12. In physical size and appearance it is similar to the U. H. F. unit and similar parts have been indicated with corresponding reference characters.

The impedance matching circuit used in the V. H. F. unit is shown in the schematic diagram of Fig. 9. The action of the impedance matching circuit is fundamentally different from that of the U. H. F. unit. The narrow band of operating frequencies eliminates the necessity for true broad-band matching, and consequently the attempt is made to achieve adequate match with maximum circuit simplicity and ease of fabrication. The matching unit consists of a line transformer 30 having an impedance $Z_j$ and mounted between blocks 14 and 18. Also mounted between these blocks is a dummy element 31 which serves merely to maintain symmetry. The inner conductor of line transformer 30 is connected by an insulated lead 33, which passes through a terminal 32 to the inner conductor of a series stub element 34 having an impedance $Z_k$. The stub 34 is shorted at its lower end and has its outer conductor connected by terminal 35 and block 23 to the outer conductor of an opened shunting section 36 which has an impedance $Z_q''$ in the matching circuit. The inner conductor of open shunt section 36 is connected by lead 37 to the outer conductor of line transformer 30 at terminal 32. Thus the impedance matching section has high impedance output terminals at 32, 35. These terminals are connected through the mounting blocks to the tubes 1', 1 of the central coupling section.

The chief electrical difference between the U. H. F. and V. H. F. units is that the line elements composing the latter are approximately 33° in electrical length rather than 90°, or a quarter wavelength, as in the U. H. F. unit. This relatively short electrical length is necessitated by restrictions on physical size; it is apparent that because of the lower frequency of operation quarter-wave elements would be excessively large. Resonance of the elements at mid-band, which is required for proper operation of the coupling section, is achieved by additional line sections which add the required susceptance or reactance.

Fig. 10 shows a schematic diagram of the resulting coupling circuit. The impedances $2Z_u$ of the shorted line sections 1, 1' and 2, 2' and the impedance $2Z_c$ due to capacitative coupling between them are again present. The impedance $Z_q'$ does not exist as an individual element. It is combined with the impedance $Z_q''$ of the matching section, both of which are formed physically by the open shunting section 36. $Z_d$ in the V. H. F. unit is the open line impedance between tube 2 and the outer conductor of coaxial line 4, for example, as may be seen by reference to Fig. 12 which shows only one tube cut away since all tubes are identical. $Z_r$ is the impedance of the shorted coaxial line section formed by line 4 and an inner conductor 37 to which the bridging cables 5 are connected. Insulators 38 for the bridging cables 5 have been omitted from Fig. 12 to show the connection. Cap 6' when secured in position over the cables complete the assembly.

Although the use of line elements shorter than a quarter wave length results in more rapid change of $Z_{p1}$ with frequency in the V. H. F. unit than takes place in the U. H. F. unit, the narrower operating band of frequencies more than compensates for the difference. The characteristic impedance of the coupling section actually changes less than 2 percent over the band, and for practical purposes can be considered constant at approximately 120 ohms. Because of the lower frequency of operation, lumped loading effects, such as occur in the U. H. F. unit, cause no difficulty and compensating schemes are not required. The maximum V. S. W. R. for the V. H. F. unit is also less than 1.4 and its gap shunting capacitance is 25 mmf. The similarity in physical construction to the U. H. F. unit would also lead to the same voltage breakdown characteristic.

Thus it is seen that in both frequency bands coupling units have been provided which give a very low mismatch loss in the pass band and at the same time offer a small gap shunting capacitance at liaison transmitter frequencies and have a high voltage breakdown point. These units incorporate a balanced coupling circuit to prevent coupling to the gap in which they are intended to be used and also are provided with input and output impedance matching networks which further serve as balun to connect the balanced coupling circuits to unbalanced coaxial feed line.

Although preferred physical embodiments of the invention have been described in detail above, it is understood that the invention is defined solely by the appended claims.

What I claim is:

1. In a four terminal electrical network, a pair of input terminals and a pair of output terminals, a tubular conductor connected to each of said terminals, the first and second said tubular conductors being connected at one end to said pair of input terminals and being connected together at the other end to form a first shorted section of transmission line, the third and fourth said tubular conductors being connected at one end to said pair of output terminals and being connected together at the other end to form a second shorted section of transmission line, said first and second shorted sections of transmission line being positioned in capacitatively coupled relation to each other; each of said tubular conductors containing a central conductor separated from said tubular conductor by a dielectric medium so as to form with said tubular conductor an open section of coaxial transmission line; a first bridging conductor connecting the central conductors within the first and third said tubular conductors, a second bridging conductor connecting the central conductors within the second and fourth said tubular conductors, said first and second bridging conductors forming a transmission line.

2. Apparatus as in claim 1 wherein said central conductors within each of said tubular conductors are the outer conductors of shorted sections of coaxial transmission line, said bridging conductors being connected to the inner conductors of said shorted sections of transmission line.

3. In a high frequency band-pass coupling and isolating unit, an input connector adapted to connect said unit to an unbalanced coaxial feed cable, a first four terminal impedance matching circuit including two unbalanced low input impedance terminals connected to said input connector and two balanced high output impedance terminals, a four terminal balanced band-pass coupling circuit including two shorted quarter-wave balanced line sections resonant at the mid-band frequency and placed in capacitatively coupled relation to each other, each of said line sections being formed of outer and inner tubular conductors, the conductors of one of said shorted line sections being connected to said two output terminals of said first impedance matching circuit, the conductors of the other of said shorted line sections being connected to the input terminals of said second impedance matching circuit, the conductors of the other of said shorted line sections being connected to the input terminals of said second impedance matching circuit, a shunting impedance coupled between said line sections, said shunting impedance including said inner conductor in each of said tubular outer conductors, said inner conductors being separated from said tubular conductor by dielectric medium so as to form with said tubular conductor an open quarter-wave section of coaxial transmission line; first and second bridging conductors respectively connecting the central conductors within the first and second tubular conductors of one said shorted line section to the central conductors within the first and second tubular conductors of said other said shorted line section, said first and second bridging conductors forming a transmission line, said coupling circuit further including two input terminals connected to the two balanced output terminals of said first impedance matching circuit and also having two output terminals, a second four terminal impedance matching circuit having two balanced high input impedance terminals to which the output terminals of said coupling circuit are connected and also having two unbalanced low output impedance terminals connected to an output connector, said output connector being adapted to connect said unit to an unbalanced coaxial cable, said first and second impedance matching circuits each having image impedances which are approximately equal at the center frequency of the pass-band of said coupling circuit to the characteristic impedances respectively of the coupling circuit and of the coaxial feed cable in which the unit is adapted to be inserted, whereby said unit will have a voltage standing wave ratio of less than 1.4 at all frequencies within the pass-band.

4. Apparatus as in claim 3 wherein said first impedance matching circuit comprises a quarter-wave coaxial line transformer, a shorted coaxial line shunting stub connected across the input terminals of said line transformer, and an open end coaxial line stub connected in series with the inner conductor of said line transformer; and wherein said second impedance matching circuit is the mirror image of said first impedance matching circuit.

5. Apparatus as in claim 4 wherein said tubular conductors forming said shorted line sections are mounted in parallel relation to each other and perpendicularly to two dielectric end plates between which the unit is assembled.

6. In a high frequency band-pass coupling and isolating unit, an input connector adapted to connect said unit to an unbalanced coaxial feed cable, a first four terminal impedance matching circuit including two unbalanced low input impedance terminals connected to said input connector and two balanced high output impedance terminals, a four terminal balanced band-pass coupling circuit including two shorted balanced line sections placed in capacitatively coupled relation to each other and having an electrical length of 33° at the center frequency of the pass-band of said coupling circuit, each of said balanced line sections being formed of outer and inner tubular conductors, the conductors of one of said shorted line sections being connected to the two output terminals of said first impedance matching circuit, the conductors of the other of said shorted line sections being connected to the input terminals of said second impedance matching circuit; a shunting impedance coupled between said line sections, said shunting impedance including said inner conductor in each of said outer tubular conductors, said central conductor being separated from said tubular conductor by a dielectric medium so as to form with said outer tubular conductor an open section of coaxial transmission line; said central conductors within each of said tubular conductors being shorted sections of coaxial transmission line; first and second bridging conductors respectively connecting the inner conductors of the central coaxial conductors within the first and second tubular conductors of one of said shorted balanced line sections to the inner conductors of the central coaxial conductors within the first and second tubular conductors of said other shorted balanced line section, said first and second bridging conductors forming a transmission line, said coupling circuit further including two input terminals connected to said two balanced output terminals of said first impedance matching circuit and also having two output terminals, a second four terminal impedance matching circuit having two balanced high input impedance terminals to which the output terminals of said coupling circuit are connected and also having two unbalanced low output impedance terminals connected to an output connector, said output connector being adapted to connect said unit to an unbalanced coaxial cable, said first and second impedance matching circuits each having image impedances which are approximately equal at the center frequency of the pass-band of said coupling circuit to the characteristic impedances respectively of the coupling circuit and of the coaxial feed cable in which the unit is adapted to be inserted, whereby said unit will have a voltage standing wave ratio of less than 1.4 at all frequencies within the pass-band.

7. Apparatus as in claim 6 wherein said first impedance matching circuit comprises a coaxial line transformer having a shorted series stub connected in series with the inner conductor of said line transformer and having an open shunt stub connected across said line transformer at the termination point of said series stub; and wherein said second impedance matching circuit is the mirror image of said first impedance matching circuit.

8. Apparatus as in claim 7 wherein said tubular conductors forming said shorted balanced line sections are mounted in parallel relation to each other and perpendicularly to two dielectric end plates between which the unit is assembled.

References Cited in the file of this patent

UNITED STATES PATENTS

| | | |
|---|---|---|
| 2,189,284 | Fritz | Feb. 6, 1940 |
| 2,327,418 | Goldmann | Aug. 24, 1943 |
| 2,419,985 | Brown | May 6, 1947 |
| 2,517,969 | Brown | Aug. 8, 1950 |
| 2,567,235 | Rabuteau | Sept. 11, 1951 |

FOREIGN PATENTS

| | | |
|---|---|---|
| 298,348 | Switzerland | Apr. 30, 1954 |